D. N. TOWE.
STREET SWEEPER.
APPLICATION FILED MAR. 7, 1913.

1,088,746.

Patented Mar. 3, 1914.
7 SHEETS—SHEET 6.

Witnesses
Hugh H. Ott.
Dudley B. Howard.

Inventor
Durward N. Towe
By Victor J. Evans
Attorney

UNITED STATES PATENT OFFICE.

DURWARD N. TOWE, OF WEST DURHAM, NORTH CAROLINA.

STREET-SWEEPER.

1,088,746.  Specification of Letters Patent.  Patented Mar. 3, 1914.

Application filed March 7, 1913. Serial No. 752,703.

*To all whom it may concern:*

Be it known that I, DURWARD N. TOWE, a citizen of the United States, residing at West Durham, in the county of Durham and State of North Carolina, have invented new and useful Improvements in Street-Sweepers, of which the following is a specification.

This invention relates to street sweepers and has for an object to provide a device of this character which will be very compact in form so as to occupy a small amount of space, which will be very efficient in operation, and which may be propelled by the use of a minimum amount of power.

A further object is the provision of a street sweeper which is constructed so as to be particularly efficient in cleaning irregular surfaces, such as rough streets or streets having car tracks thereon.

Another object is to provide a device of this character which will occupy a very small amount of transverse space and which may be operated very close to curb stones or other limiting obstacles, and which will in such operation clean the street very near to the obstructions.

A still further object of the invention is the provision of removable means for housing the operative parts of the machine to prevent the escape of dust which may arise from the sweeping operation, and to provide further means for sprinkling water upon the dust as it is collected in a receptacle provided for the purpose.

Another object is to include a dust bin provided generally for the reception of the collected dirt and refuse matter, and a removable receptacle adapted to be mounted within the bin so as to receive the said refuse matter in order to facilitate the operation of removing the latter from the bin.

A still further object is the provision of readily operable means for dumping the removable dirt receptacle when desired.

Another object of the invention is to provide readily operable means for rendering the sweeping device inoperative whenever desired.

The invention consists in the features of construction combination and arrangement of parts, hereinafter fully described and claimed, reference being had to the accompanying drawings, in which:

Referring to the drawings, 1 designates the rectangular dust bin which has its upper end open and has the outer edges of its front and rear walls 2 and 3 cut away as at 4 and 5 respectively, the cut away portion 5 being of greater depth than the cutaway portion 4. The bottom wall or floor 6 of the dust bin is provided adjacent the side walls 7 and 8 thereof with longitudinal slots 9 and 10, respectively, for the reception of the wheels 11 and 12 which are journaled on the bearing spindles 13 and 14 attached to auxiliary side walls 15 and 16 provided adjacent said slots. Auxiliary top walls 17 and 18 connect the upper edges of the walls 15 and 16, respectively, with the corresponding side walls proper of the bin so as to effectively shield the wheels from the dust collected within the bin. The wheels 11 and 12 protrude through the slots 9 and 10 sufficiently to permit engagement thereof with the street, so that the bin is thus mounted upon the said wheels for movement along the street or other surface to be cleaned. The bin is further provided with an opening 19 having a hinged closure 20 therefor. A substantially V-shaped platform 21 extends forwardly from the bottom of the dust bin and is provided with suitable draft-attaching means 22 at its pointed end.

A removable dirt receptacle 23 mounted upon rollers 24 is adapted to be positioned upon the platform 21 and to be moved into the bin 1 through the said opening 19 when the closure 20 is in open position. The side walls of the receptacle are flared outwardly as at 25 so as to cover the auxiliary walls 17 and 18 provided within the bin, and thus to provide a mouth of substantially the same area as the interior of the bin so that all the dust falling into the bin will be accumulated within the receptacle.

A fixed frame 25′ extends rearwardly from the bin 1 and includes the parallel side members 26 which are fixedly attached to the sides of the bin adjacent the upper end thereof. Each frame member 26 includes a horizontal portion 27 and a downwardly extending end portion 28 having a supporting bracket 29 attached thereto and provided with a wheel 30 journaled in a horizontally rotatable foot 31, so as to provide means for supporting the said ends of the frame members during movement of the sweeper in any direction. The members 26 are maintained in parallel relation to each other by the cross braces 26ª.

A movable frame 32 is mounted for vertical swinging movement between the side members of the fixed frame. The movable frame includes the parallel side members 33 which are hinged to the bin body adjacent the upper rear corners thereof as at 34, and which are maintained in proper relative position with respect to each other by means of the connecting cross braces 35. Each member 33 comprises an inclined portion 36, a horizontal portion 37 and an upright portion 38 extending upwardly from the rear end of the latter. An inclined deflecting plate 39 is pivotally attached as at 40 to the upper edge of the rear bin wall 3 and is disposed with its major portion parallel to the inclined portions 33 of the movable frame members. The inner end of this plate is inclined downwardly as at 41 for a purpose to be described more fully hereinafter. Its outer rearmost end is disposed beneath the angle formed between the inclined and horizontal portions of the movable frame members, and is supported by casters 42, which are adapted to move in any direction upon the street. A transversely extending roller 43 is pivotally mounted, in spaced relation to the outer, active face 44 of the member 39 at the lower rear edge of the same, between the bearing brackets 45 attached to the member 39.

A roller 46, including the independently and vertically movable sections 47, is mounted between the movable frame members 32 at the angle formed between their horizontal and upright portions 37 and 38 in a manner which will be described. Each end of the roller sections 47 is provided with a tapered recess 48, and the recess 48 in the adjacent ends of the roller sections is adapted to receive the tapered, oppositely extending pintles 49 formed on the lower end of a supporting member 50. These supporting members are vertically movable through properly spaced openings in a transverse attaching bar 51 connecting the upright portions 38 of the movable frame members. Each member 50 is provided beneath the bar 51 in spaced relation thereto with an annular flange 52. A helical spring 53 is mounted upon the member 50 between the said flange and the bar 51. Each member 50 is further provided at its upper end with a limiting head 54 adapted to engage the upper face of the bar 51 to limit the downward movement of the said member as caused by the corresponding spring 53. It will thus be seen that I have provided for slight tilting movement of the roller sections 47 as caused by the vertical movement of the adjacent ends of different pairs of rollers, the purpose of which will be described presently.

A second similarly constructed roller 55 including the same number of sections 56 as the sections 47 of the roller 46, is disposed in superimposed relation to the said roller 46, it being mounted above a second adjacent bar 57 connecting the upright portions of the movable frame members adjacent the upper ends thereof, by means of supporting members 58, which latter are constructed similarly to the previously described members 50. These members 58 are disposed in inverse relation to the members 50, the helical springs 59 surrounding the same being positioned above the bar 57 so as to support the said members, due to the engagement of the upper ends of the springs with the annular flanges 60 formed on said members. The limiting heads 61 are thus disposed beneath the bar 57 for limiting engagement with the under face thereof.

A sweeping element 62, in the form of an endless belt including the slightly spaced sections 63, is movable around the rollers 43, 46, and 55, and also is extended into the dust bin through the cut away portion 5 thereof and passes around an operating roller 64 rotatably mounted therein upon the transverse shaft 65. The belt sections 63 pass around the respective roller sections 47 and 56 of the rollers 46, and 55, and are provided with transversely alining, relatively spaced rows of bristles 66 on the outer surfaces thereof. These transverse brushes, or transverse rows of bristles, are adapted to engage the surfaces of the street over which the machine is passing, while passing beneath the horizontal portion 37 of the movable frame members, and are then adapted to engage the active face 44 of the deflecting member 39 during inward movement thereof so as to force the collected dust and other refuse up the said member into the dust bin. The inclined inner end 41 of the member 39 is disposed at such an angle that the bristles 66 will be caused to gradually assume their extended position after passing over the inclined portion of the deflecting member, so that the refuse matter will not be thrown toward the forward end of the receptacle alone, as would be the case were the bristles allowed to spring suddenly into extended position. This feature of construction tends to prevent unnecessary scattering of dust within the bin, the prevention of which is one of the primary objects of the invention.

In order to facilitate the action of the brushes carried by the sweeping element in forcing the dirt from the street on to the deflecting member 39, I have provided a plurality of vertically movable, inclined fingers 67 which are pivoted by means of transverse pivot members 68 to the lower edge of the member 39. These fingers 67 are normally maintained in spaced relation to each other by means of springs 69 mounted upon the pivot members 68 in interposed relation to the fingers, so that there will be little friction between the fingers during their relative vertical movement as caused by the fingers passing over irregular surfaces, or obstructions, such as street car tracks and the like.

In order to prevent dirt from passing through the spaces 70 through the fingers 67 and thus hindering the operation of forcing the same on the inclined deflecting member, I have provided flexible connecting members 71 connected beneath the fingers and spanning the said spaces. These members 71 are secured in suitable manner to the adjacent edges of the fingers 67 so as to present loose folds, which will not hinder the relative movement of the fingers, but which will serve as deflecting surfaces adapted to be engaged by portions of the sweeping brushes which are adapted to extend between the fingers 67 as they pass on to the deflecting members.

In order to prevent unnecessary noise, which would result from direct contact between the fingers 67 and the street, especially when passing over irregular surfaces, it is desirable to provide brackets 72 beneath the fingers to which are pivotally attached the supporting wheels 73, which latter may be constructed of rubber, or some such elastic material if desired.

In order to maintain the horizontal sweeping portion of the sweeping element in proper engagement with the street at all times, I have attached a vertically disposed connecting rod 74 to the horizontal portion 37 of each movable frame member 32 as at 75, which is adapted to extend upwardly through a working slot 76 in the end of a vertically movable operating arm 77 having a lateral stub shaft 78 at the forward end thereof which is rotatably mounted within a bearing 79 depending from the horizontal portion 27 of the corresponding fixed frame member 26. Annular flanges 80 and 81 are provided upon the rod 74 in spaced relation to the upper and lower face respectively, of the arm 77, and helical springs 82 and 83 are interposed between the said flanges and the arms 77 for a purpose which will be presently described.

Figures 1, 2:
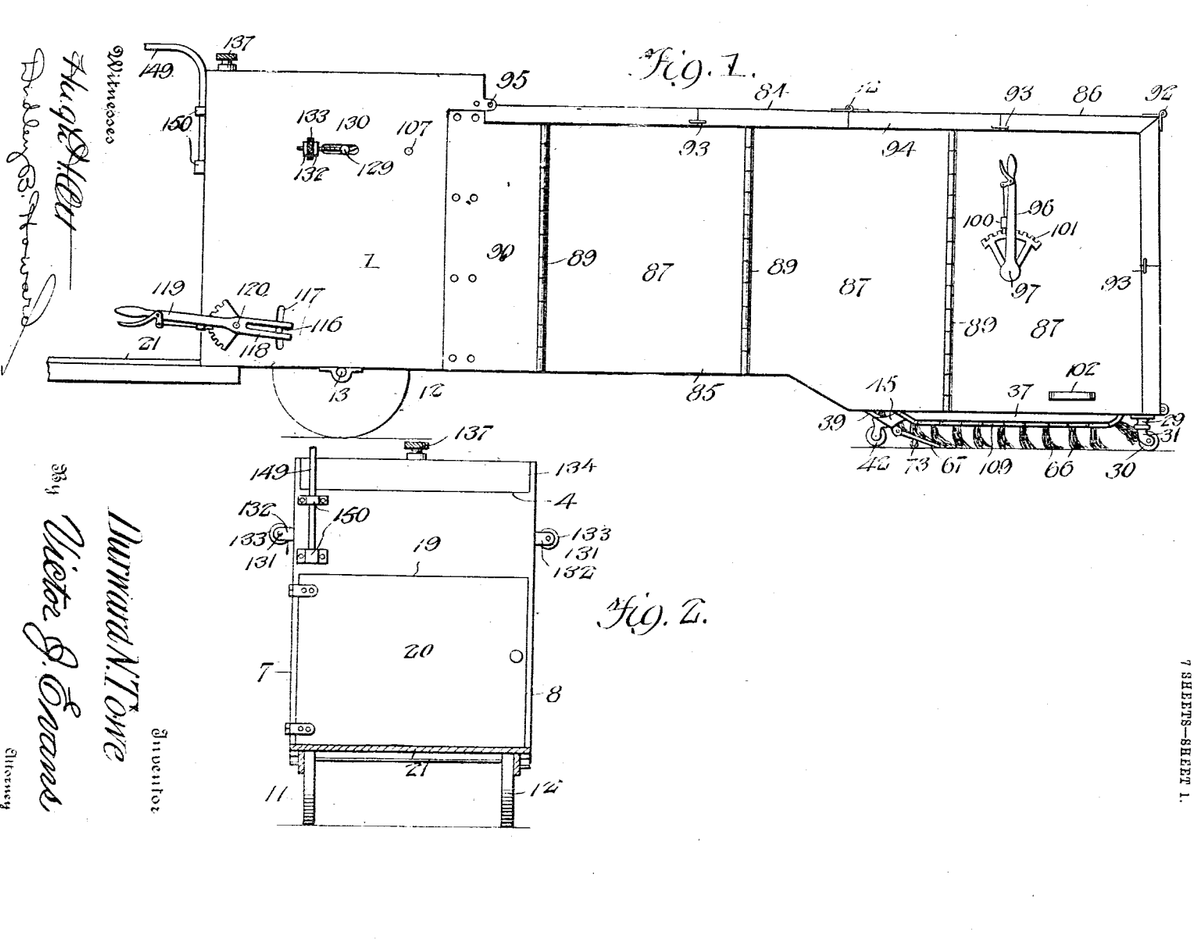
Figure 1 is a side elevation of the device showing the housing for the operative parts thereof in closed position.
Fig. 2 is a front elevation thereof.
Figure 3:
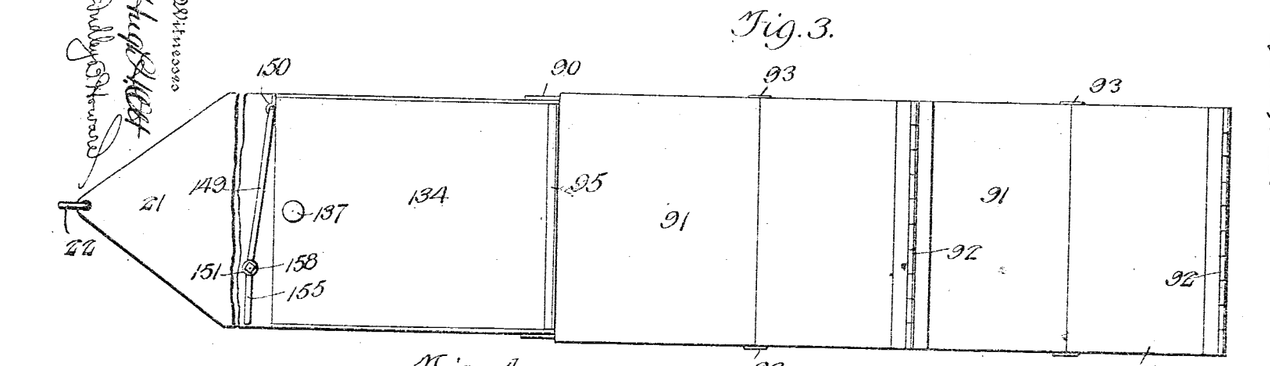
Fig. 3 is a top plan view.
Figure 4:
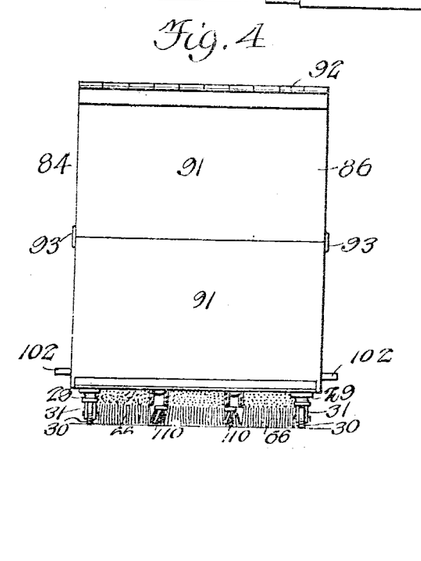
Fig. 4 is a rear elevation.
Figure 5:
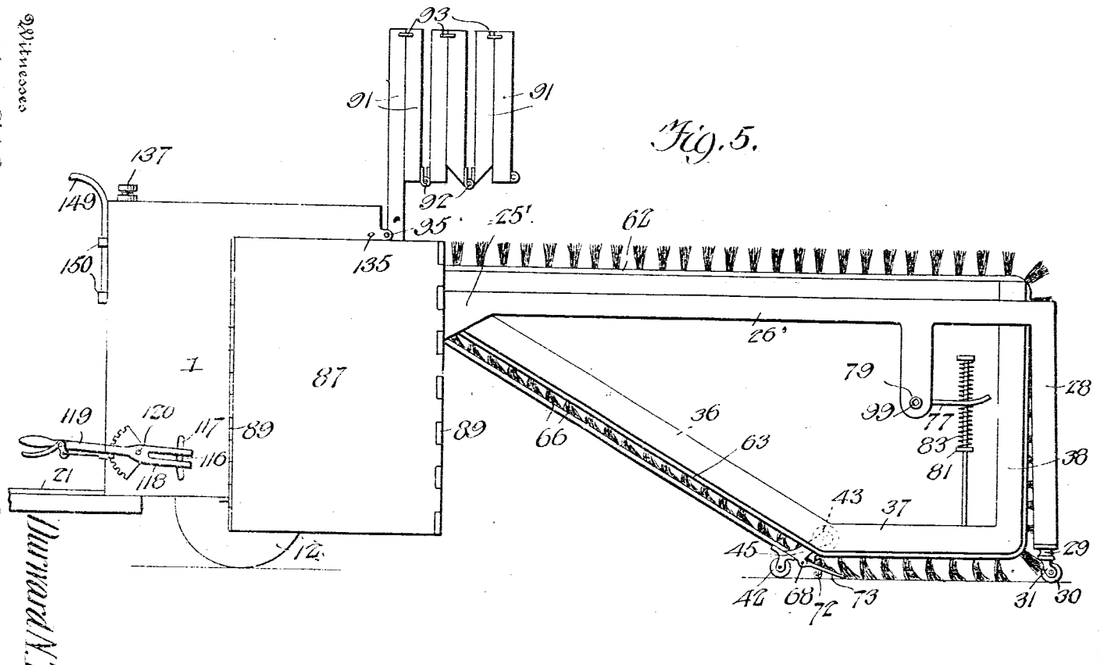
Fig. 5 is a side elevation of the device showing the housing for its operative parts in open position.
Figure 6:
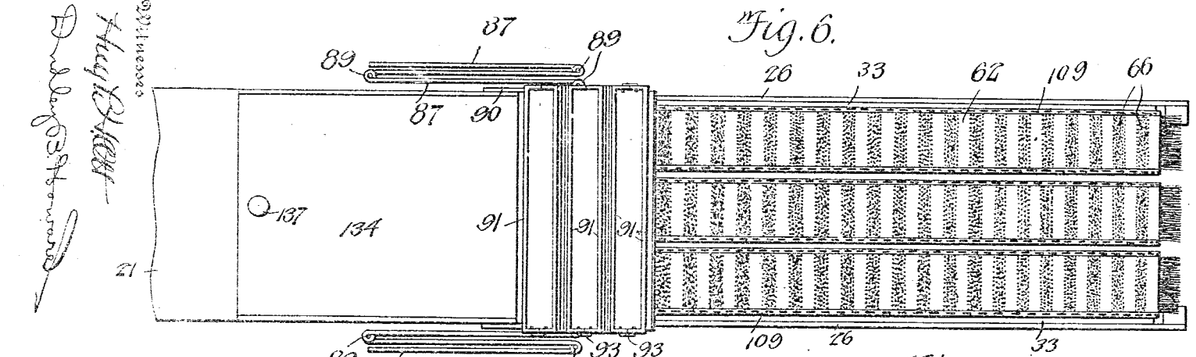
Fig. 6 is a top plan view thereof.
Figure 7:
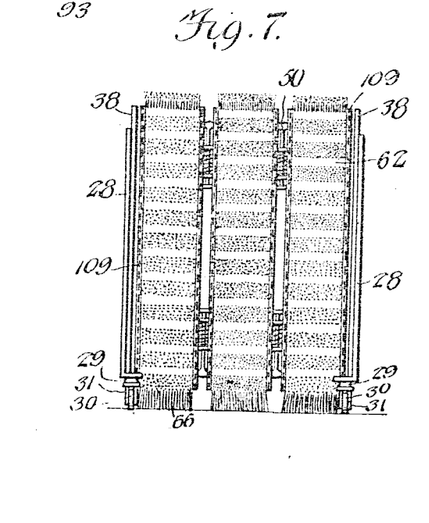
Fig. 7 is a rear elevation thereof.
Figure 8:
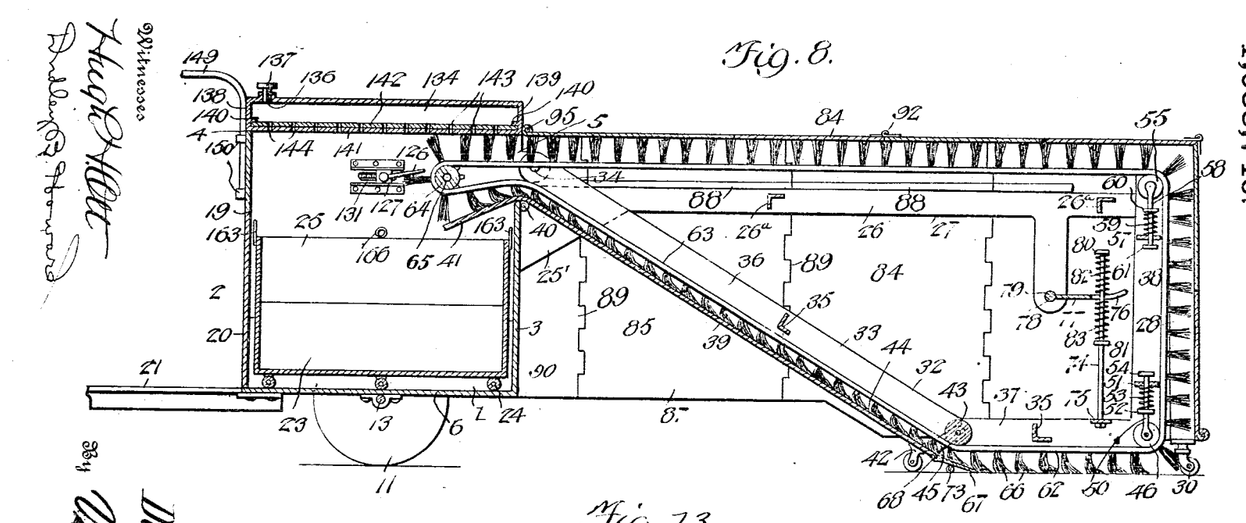
Fig. 8 is a longitudinal, vertical sectional view through the device as shown in Fig. 1.
Figure 9:
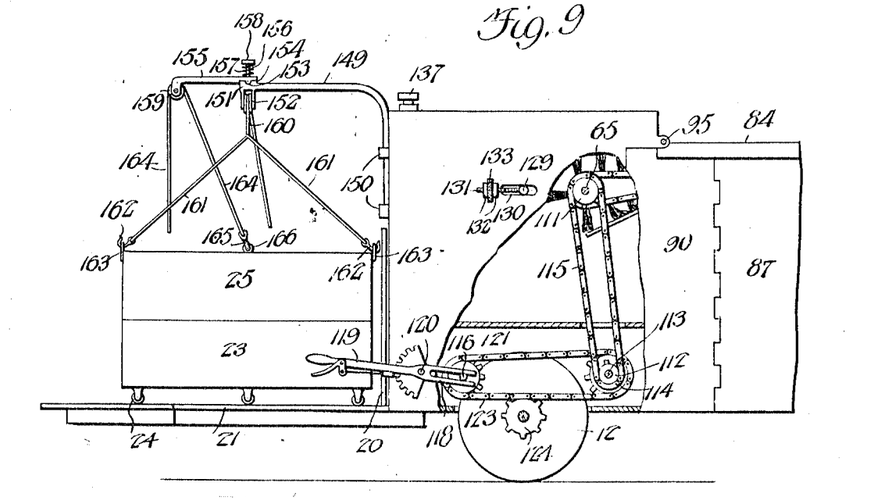
Fig. 9 is a fragmentary side elevation of the dust bin, showing the means for connecting the supporting wheels therefor with the sweeping belt in operative position
Figure 10:
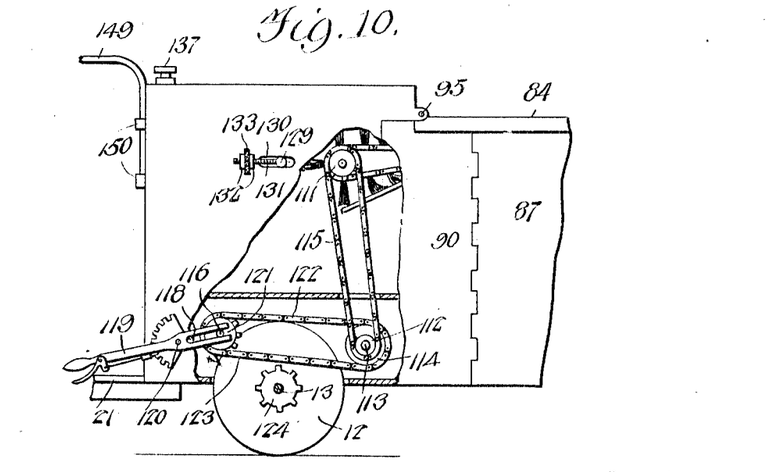
Fig. 10 is a similar view showing the said means inoperative.
Figure 11:
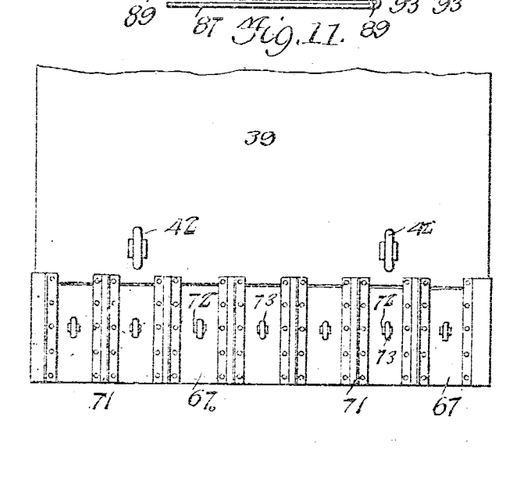
Fig. 11 is a fragmentary bottom plan view of the inclined guiding plane, showing the movable deflecting fingers.
Figure 12:
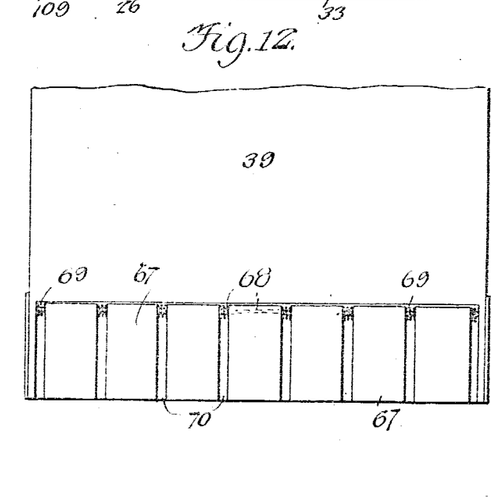
Fig. 12 is a fragmentary top plan view of the same.
Figure 13:
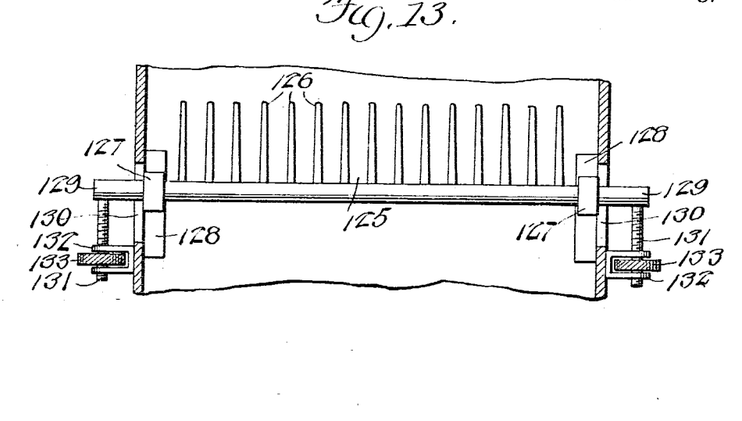
Fig. 13 is a transverse sectional view taken through a portion of the dust bin, showing the cleaning comb in elevation.
Figure 14:
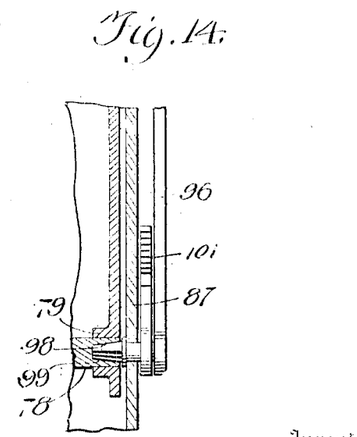
Fig. 14 is a fragmentary rear elevation of the adjusting means for the movable frame.
Figure 15:
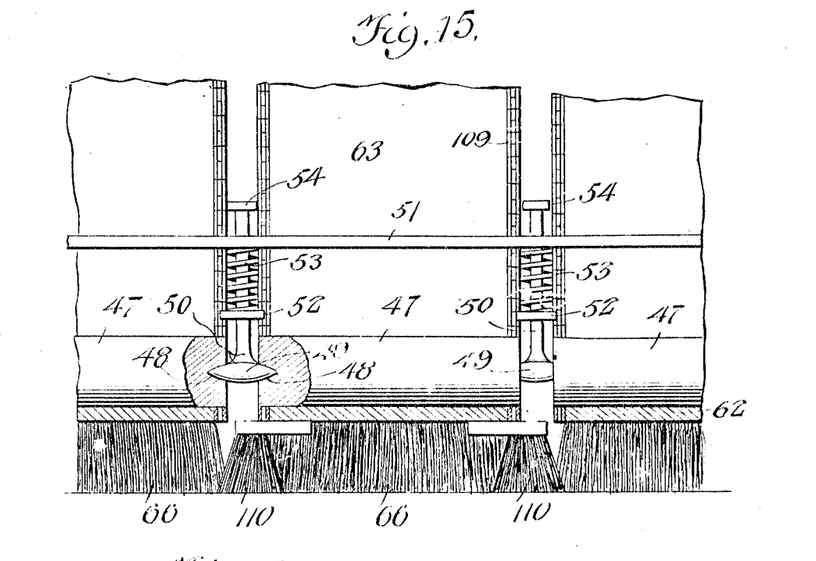
Fig. 15 is a detail sectional view taken transversely through a portion of the belt and sectional rollers associated with the same; and, Fig. 16 is a transverse sectional view taken through the dust bin.
Figure 16:
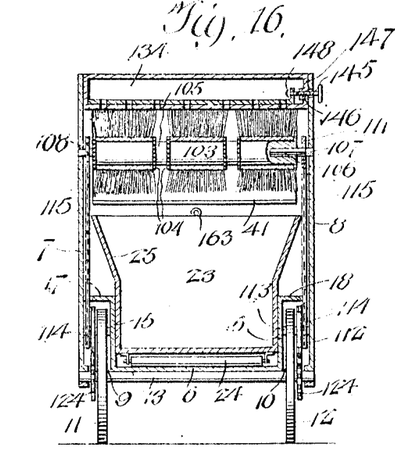

I have provided a housing 84 which is adapted to inclose the operative parts of the sweeping portion of the machine, which includes the fixed and movable frames and the major portion of the sweeping element. This housing includes the foldable side portions 85 and the foldable connecting and retaining portion 86 which latter is adapted to cover the top and rear end of this portion of the machine. The side portion 85 of the housing consists of the hinged sections 87, which are adapted to be swung outwardly, after the connecting portion 86 has been collapsed, in order to permit access to the above described operative parts of the machine. The sections 87 are provided on either inner face adjacent the upper ends thereof with horizontal cleats 88 which are adapted to be in alinement when the said sections are extended into operative position so as to become engaged with the upper edges of the horizontal portions 26 of the fixed frame members, so that the latter will aid in supporting the said housing sections, thus removing considerable strain from the hinges 89 connecting the said sections with each other and with the rearwardly extending attaching portions 90 of the dust bin. The sections 91 of the housing portion 86 are oppositely hinged to each other as at 92 and 93 alternately so as to facilitate the folding of the same into a compact mass, as shown particularly in Fig. 6, and are provided with inwardly extending side flanges 94, which latter are adapted to engage the outer side faces of the side portions of the housing adjacent the upper edges thereof so as to effectively retain the same in operative position against the fixed members. The hinges 92 are leaf hinges connected to the outer faces of the sections 91 at the meeting edges thereof, whereas the hinges 93 are in the form of links attached pivotally to the retaining flanges 94 at the meeting edges thereof, as shown in the drawings, but it is to be understood that any suitable form of hinge which will accomplish the desired purpose may be resorted to in practice without departing from the general scope of the invention. The innermost section 91 is hinged as at 95 to the upper rear corners of the dust bin.

The rearmost section 87 of each side portion of the housing is provided with an adjustable hand lever 96 on the outer face thereof, whose fixedly attached pivoting shaft 97 extends through an opening in the said section into the interior of the housing, where it is provided with a tapered angular engaging extremity 98 adapted for engagement within a similarly shaped receiving socket 99 provided in the outer end of the stub shaft 78 formed on the operating arm 77. The locking tooth 100 carried by the lever 96 is engageable with the rack segment 101, so that the operating arm 77 may be moved into different vertically adjusted positions and locked therein, so as to secure the horizontal sweeping stretch of the sweeping element in either its lowermost, operative position, or in elevated, inoperative position. Upon movement of the said portion of the sweeping element into inoperative position, the lower end of the deflecting plate 39 will be elevated due to the fact that upward pressure will be exerted on the roller 43, which serves to maintain the sweeping element in proper parallel relation to the said deflecting plate. A curved enlargement 102 is formed on the outer face of the rearmost section 87 of each side portion of the housing adjacent the lower edge thereof to provide means for engagement with curbstones or like obstructions, to prevent scraping of the same against the side portions of the housing.

The operating roller 64, which is rotatably mounted within the dust bin includes active sections 103, pairs of toothed gears 104 interposed between said sections, short spacing sections 105 interposed between the gears of each pair, and the shaft 65 including a rectangular body portion 106, upon which said roller sections and gears are mounted and held against rotation thereon, and the reduced, cylindrical end portions 107 mounted within suitable bearings 108 in the side walls of the bin. The belt sections 63 pass around the active sections 103 of the said shaft, and the sprocket chains 109 secured to the side edges of the said belt sections are in engagement with the gears 104.

In order to provide means for sweeping dirt which may be disposed upon the street or upon the inclined deflecting plate 39 between the spaced adjacent edges of the belt sections, auxiliary brush sections 110 are preferably secured to the outer faces of alternate belt sections at both sides thereof so as to overlap to a considerable extent the spaces intervening between said belt sections and the sections adjacent thereto. These auxiliary brush sections are preferably disposed between alternate rows of the main brush sections.

A sprocket wheel 111 is fixedly mounted upon the end of the shaft 65 adjacent the side wall 8 of the dust bin and is disposed in alinement with a sprocket wheel 112 rotatably mounted upon the shaft 113 mounted between the said side wall 8 and the auxiliary wall 16. This sprocket wheel 112 is fixedly connected to a second, and preferably larger sprocket wheel 114, which is rotatable with the sprocket 112 upon the shaft 113. A sprocket chain 115 connects the sprocket wheel 111 with the sprocket 112. A short shaft 116 extends inwardly through the side wall 8 of the dust bin adjacent the front edge thereof through an arcuate slot 117 concentric with the shaft 113, its outer end being preferably rectangular in section and slidably mounted within the bifurcated inner arm 118 of an adjustable hand lever 119 pivoted at 120 to the outer face of the side wall 8. A sprocket wheel 121 is rotatably mounted upon the inner end of the shaft 116 and is connected with the sprocket 114 by means of a sprocket chain 122. Upon adjustment of the hand lever 119, the shaft 116 together with the sprocket wheel 121 will be adjusted vertically. The lower stretch 123 of the chain 122 may thus be brought into engagement with a sprocket wheel 124, which is fixedly attached to the supporting wheel 12, or may be removed from engagement therewith. Means is thus provided for throwing the sweeping element into or out of gear with the wheels 12, which latter serves as a source of power for operating the sweeping element, during motion of the sweeper as a whole along a street to be cleaned.

A cleaning comb 125 extends transversely through the upper portion of the dust bin, and includes the rearwardly extending and slightly upwardly inclined teeth 126 adapted for engagement with the sweeping brushes so as to remove any dirt that may have adhered to the same, before they pass again into operative position. This comb is provided adjacent its ends with rectangular heads 127 which are adapted to move slidably within horizontal guides 128, thus preventing rotary movement of the comb. The extremities 129 thereof are movable within the slots 130 in the side walls of the dust bin communicating with the guides 128 secured to the inner faces of the said walls. Forwardly extending, threaded arms 131 project laterally from the said extremities 129 and are slidably movable through the spaced, apertured lugs 132 formed on the exterior face of the said side walls. An adjusting nut 133 is threaded upon each arm 131 between the corresponding pair of lugs 132, whereby means is afforded by which the comb may be adjusted in proper relation to the sweeping element whenever the occasion may demand it.

A water tank 134 is hinged at 135 within the upper end of the bin between the side walls thereof, its ends projecting into the cut away portions 4 and 5. This tank is provided adjacent the forward, free end thereof with a supply opening 136 having a threaded closure plug 137 therefor, and is further provided on the inner faces of its end walls 138 and 139 with transversely extending guide ridges 140, between which and the bottom wall 141 of the tank is mounted for slight, transverse sliding movement, a perforated valve plate 142. The perforations 143 of the valve plate are adapted to be brought into registration with the perforations 144 provided in the bottom wall 142 of the tank, upon proper adjustment of the adjusting member 145, which is threaded into an opening 146 in the side wall 147 of the tank, and whose inner end is rotatably attached as at 148 to the adjacent side edge of the valve plate 142. Upon operation of the member 145, the rate at which water or such liquid may be sprinkled upon the dust in the dust bin and the sweeping element, as it moves through the same, may be regulated to suit the requirement of usage. In hot, dry weather it will become necessary to sprinkle the water rapidly upon the dust as it passes into the bin, whereas, in damp weather the rate of sprinkling may be greatly reduced.

In order to provide readily operable means for inverting the removable receptacle 23, when the same has been rolled out from the bin onto the platform 21, so that its contents may be dumped at any desired point, I have provided a dumping attachment which may be collapsed in an unobstructing position when not in use. This attachment includes a horizontally adjustable arm 149 which is pivoted preferably by means of the bracket 150 to the front wall of the bin upon the exterior thereof. A head 151 is formed on the free end of this arm and has a pulley wheel 152 journaled transversely therein. The upper face of the head 151 is provided with intersecting grooves 153 and 154 therein for the reception of a second, adjustable arm 155, which is pivoted to the head 151 by means of a vertical pivot pin 156, and is adapted to be normally maintained in engagement with one of the grooves 153 and 154 by means of a helical spring 157 carried by the said bin and interposed between the head 158 provided thereon and the said arm. A pulley wheel 159 is longitudinally journaled at the outer free end of the arm 155. A flexible cable 160 is adapted to be mounted upon the pulley wheel 152, and is provided with diverging end portions 161 having hooks 162 provided thereupon for engagement within the attaching rings 163 provided upon the end walls of the receptacle 23 on the outer faces thereof and adjacent the centers of their upper edges. A second cable 164 is movable around the pulley wheel 159 and has one end attached by means of a hook 165 to a ring 166 secured to one side edge of the receptacle.

From the drawings, it will be seen that, upon connecting a suitable source of power, such as the source of draft for the machine proper, to the free end of the cable 160, the receptacle 23 may be elevated above the platform 21. Then the arm 149 may be swung laterally so as to carry the said receptacle away from the platform to the point where it is desired to dump the contents of the same. Then the cable 164 is operated by any suitable means, after the arm 155 has been swung into a position at right angles to the arm 149, so that the receptacle may be tilted sufficiently to dump the contents.

From the foregoing description, taken in connection with the accompanying drawings, it will be seen that I have provided a street sweeper constructed so as to be very efficient in operation upon either smooth or irregular surfaced streets, and which will be practically noiseless in operation and will not fill the atmosphere with dust.

What is claimed is:

1. In a street sweeper, a portable frame, an operating roller journaled in said frame, a deflecting plate extending rearwardly from beneath the said roller and downwardly therefrom to the surface to be swept, a second, vertically movable roller mounted upon the frame in spaced relation to the operating roller, the said second roller including a plurality of sections having their adjacent ends slightly spaced and provided with central recesses, a plurality of vertically yieldable supporting members, each having its lower end disposed between the adjacent ends of the said roller sections and having oppositely disposed pivot points engaging the recesses thereof, a third vertically movable roller disposed in superimposed relation to the second-named roller and including relatively movable sections, vertically yieldable pivoting means supporting the adjacent ends of the said sections upon the frame, and a sweeping element in the form of an endless belt passing around the said rollers and including sections so as to be accommodated to the sections of the movable rollers.

2. In a street sweeper, a portable frame, an operating roller journaled in said frame, a deflecting plate extending rearwardly from beneath the said roller and downwardly therefrom to the surface to be swept, a second, vertically movable roller mounted upon the frame in spaced relation to the operating roller, the said second roller including a plurality of sections having their adjacent ends slightly spaced and provided with central recesses, a plurality of vertically yieldable supporting members, each having its lower end disposed between the adjacent ends of the said roller sections and having oppositely disposed pivot points engaging the recesses thereof, a third vertically movable roller disposed in superimposed relation to the second-named roller and including relatively movable sections, vertically yieldable pivoting means supporting the adjacent ends of the said sections upon the frame, a sweeping element in the form of an endless belt passing around the said rollers and including sections so as to be accommodated to the sections of the movable rollers, said belt sections being slightly spaced horizontally, brushes arranged on the outer faces thereof in transversely alining, longitudinally spaced rows, and auxiliary brushes interposed between alternate main brushes upon alternate belt sections at both sides thereof so as to overlap the spaces between the same and the adjacent belt sections.

In testimony whereof I affix my signature in presence of two witnesses.

DURWARD N. TOWE.

Witnesses:
R. A. HARRIS,
JNO. F. HARWARD.